Nov. 13, 1962

K. R. ELLIOTT 3,063,298

OPERATOR FOR ROTARY VALVE

Filed Nov. 9, 1959

INVENTOR.
KENNETH R. ELLIOTT
BY Hoopes Leonard & Buell
his attys

Nov. 13, 1962 K. R. ELLIOTT 3,063,298
OPERATOR FOR ROTARY VALVE
Filed Nov. 9, 1959 2 Sheets-Sheet 2
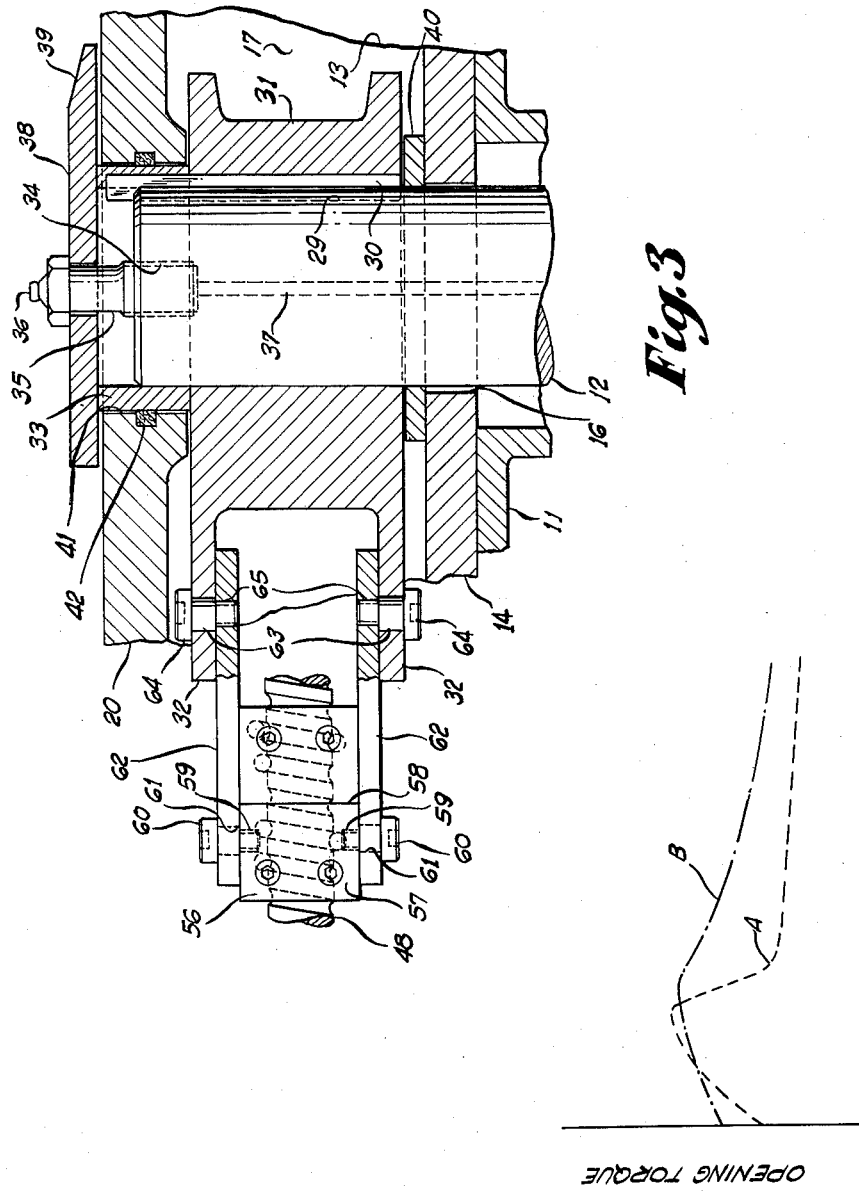
INVENTOR.
KENNETH R. ELLIOTT
BY Hooper Leonard & Buell
his attys

United States Patent Office 3,063,298
Patented Nov. 13, 1962

3,063,298
OPERATOR FOR ROTARY VALVE
Kenneth R. Elliott, Godfrey, Ill.
(% Lynn Elliott Co., 371 M & M Bldg., Houston 2, Tex.)
Filed Nov. 9, 1959, Ser. No. 851,789
5 Claims. (Cl. 74—89)

This invention relates to a valve operator for rotatable stem valves such as sphere, plug and other valves having a stem to be turned through an operative angle to open or close such valves. More particularly, this invention relates to such a valve operator having an operating screw-and-linkage mechanism for such purpose which exerts maximum force against maximum resistance to movement of the operated valve.

A valve operator of my invention is relatively trouble-free and includes linkage mechanism preferably associated with a relatively frictionless ball screw and nut to rotate the stem of a valve to which it is connected with maximum torque occurring substantially in the valve position zone of maximum resistance. Moreover, my new construction inhibits deflection of operating parts and has comparatively few operating parts which are relatively economical to manufacture and assemble. In addition, the new construction may be sealed completely in the event that it is to be utilized in hard-to-reach places or buried underground. Further, my new construction is capable of being utilized with auxiliary features, such as limit switches, of existing valve controls.

Other objects, features and advantages of my invention will be apparent from the following description and the accompanying drawings which are illustrative of one embodiment only, in which FIGURE 1 is a plan view of a valve operator embodiment of this invention with the cover removed from the main housing;

FIGURE 3 is a partial view, somewhat enlarged, taken along line III—III of FIGURE 1, and FIGURE 4 is a torque diagram useful in explaining advantages of this invention.

Figure 1:
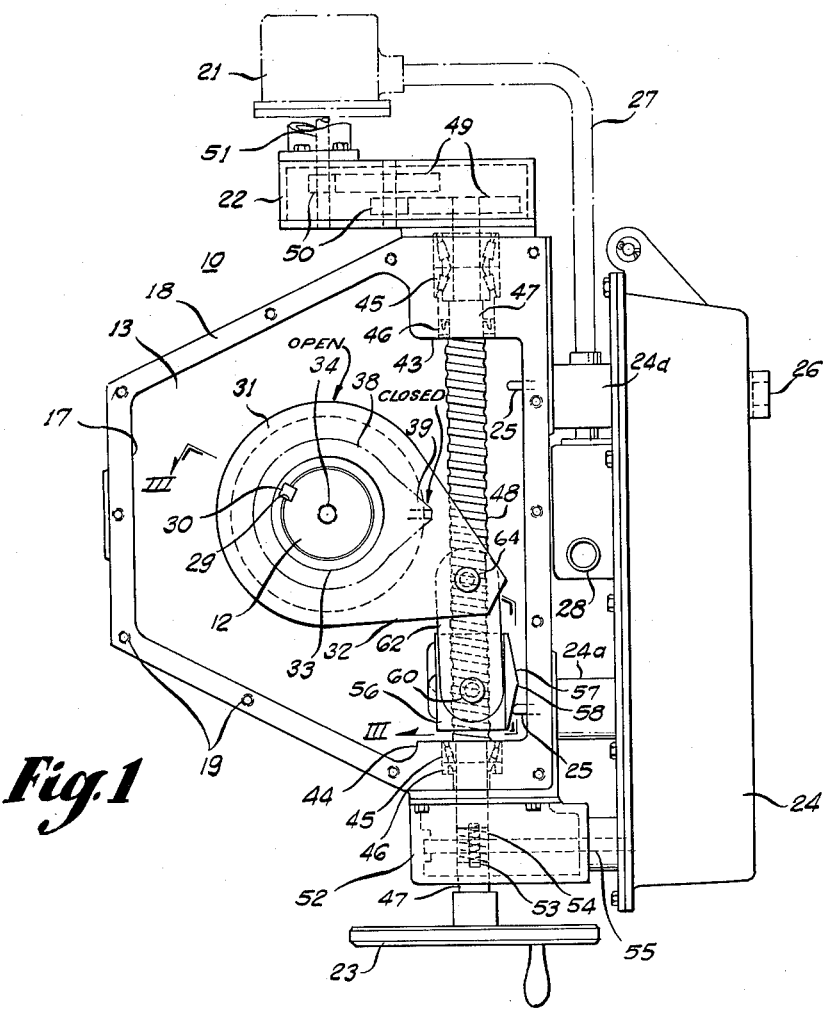
Figure 2:
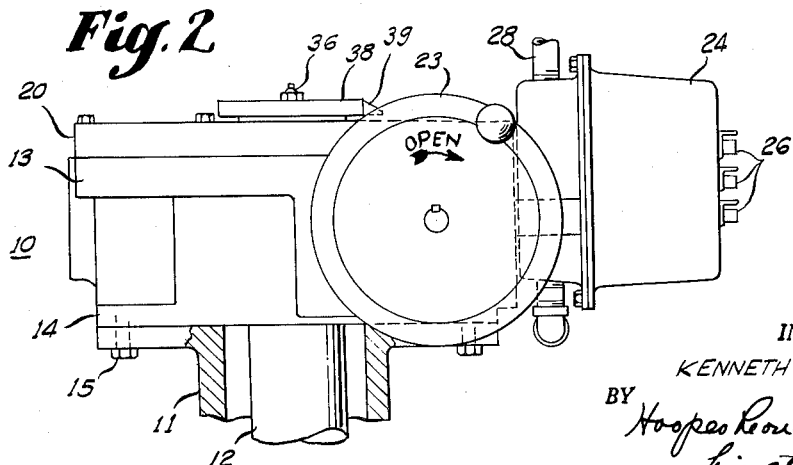
FIGURE 2 is a view in end elevation of the embodiment shown in FIGURE 1 with the aforesaid cover in place.

Referring to the FIGURES 1 to 3 of the drawings, a valve control 10 of this invention is shown, adapted to be mounted on and secured to a bonnet 11 of a valve having a rotatable stem 12 to be moved through an arc for operation of the valve anywhere between a full closed position illustrated in FIGURE 1 and a full open position ninety angular degrees therefrom in a counterclockwise direction when viewed in that figure. The valve control itself comprises a main housing 13 having a base 14 secured to bonnet 11 by bolts 15, the stem 12 extending upwardly into the housing through an opening 16 in base 14. Casing 13 is provided with enclosing walls 17 having a flat flange 18 at the top with tapped bolt holes 19 therein for the affixation of a removable cover 20.

Normally, operator 10 is operated by a prime mover 21 in the form either of a reversible electric motor, as shown, or a pressure fluid motor such as that disclosed in U.S. Patent No. 2,743,897, or other prime mover. Prime mover 21 is connected through a transmission in a transmission housing 22 to the mechanism in housing 13. An alternative manual drive for operator 10 may be provided by a handwheel 23. In the case of electric motor 21, a closed switch box 24 with a hinged cover is preferably provided and connected to housing 13 to house, for example, limit switch mechanism having trip members 25 extending through conduits 24a into the interior of housing 13 at the resective ends thereof, a reversing contactor for reversible motor 21, a timer if such is desired for timed operation of operator 10, and a push button set 26 for local push button operation of the device, suitable circuit connection piping 27 and 28 for flexible conduits being provided for appropriate wiring and, further, for connection where desired to a remote push button operation station.

The upper end of valve stem 12 may be provided with a keyway 29 to accommodate a key 30 to connect stem 12 for rotation to a hub 31 of a vertically spaced lever set 32 and to a sleeve 33. Although stem 12 is shown as one which has no axial movement, but is rotatably movable only, the invention is applicable to rotary stem valves in which there is some usually small axial movement used to "break" a seal between the movable valve member and the seat thereof before the stem is turned.

The top of stem 12 is counterbored and tapped at 34 to engage the bottom threaded portion of a stud bolt 35 which, further, if desired, may be centrally drilled and provided with a lubricating fitting 36 at the top thereof to communicate with a central opening 37 for lubricant in stem 12 which is connected to branches (not shown) to lubricate the interior of the valve. A cap 38 having a pointer 39 is held against the top of sleeve 33 by bolt 35 which sleeve in turn holds hub 31 in assembled position against a bearing ring 40 surrounding stem 12 and sealing opening 16. Pointer 39 when viewed against the top of cover 20 shows the position of the movable valve member to which stem 12 is connected, that is, as to whether it is in open or closed position, or thereinbetween. If wanted, an arcuate scale may be marked or attached to cover 20 to cooperate as an indicator with pointer 39. Cover 20 is provided with a central opening 41 for sleeve 33 and a circular seal 42 is provided in an annular space between sleeve 33 and opening 41, and, a tight fit or seal generally being provided between the inside of sleeve 33 and the exterior of the top of stem 12 so that the operator 10 is weatherproof and, further if desired, an oil level may be maintained within housing 13 in contact with the working parts.

Housing 13 is provided with integral bearing bosses 43 and 44 suitably drilled to receive thrust bearings 45 and ring seals 46 respectively. A shaft 47 is mounted in the bearings 45 for rotational movement only and is provided with a threaded ball screw portion 48 extending between the bosses 43 and 44. The right hand end of shaft 47 (FIGURE 1) is secured to a gear transmission in transmission housing 22 comprising intermeshing gears 49 and pinions 50 suitably mounted, respectively, so that whenever motor 21 turns a drive shaft 51 in the respective opening or closing direction, shaft 47 will be rotated accordingly in a corresponding direction.

Handwell 23 is affixed to the other end of shaft 47 to enable such operation and rotation of stem 12 in either direction to be performed manually. Although the connection shown is a "coincidental" connection between motor 21 and handwheel 23, it will be apparent that a "non-coincidental" mechanism may be interposed in the gearing train if such is desired. In a handwheel housing 52, shaft 47 is surrounded by and secured to a helical gear 53 which engages a helical driven gear 54 to rotate a shaft 55 correspondingly. Shaft 55 is utilized to energize the circuit of the particular limit switch in switch box 24, or other mechanism therein, toward which a nut 56 is being moved at the time being by virtue of the rotation of shaft 47.

Nut 56 is of the ball-screw type to cooperate with thread 48, sometimes called "Saginaw" thread, which is relatively frictionless. The thread on the screw shaft 47 and nut 56 may be of other kinds, such as an acme thread. A cam block 57 having a rise 58 is affixed to that side of nut 56 facing toward the limit switch trip members 25, so cam block 57 will operate whatever member 25 it engages at the respective end of its travel, assuming that the nut 56 is moved to one extremity or the other along the thread 48 for the operation of stem 12.

Nut 56 is counterbored and tapped on the top and bottom thereof at 59 to receive the lower threaded end of stud bolts 60 having bearing shanks cooperating with holes 61 in one end of a pair of vertically spaced links 62 pivotally connecting nut 56 to the respective lever arms 32. Levers 32 are provided with vertically registering openings 63 journaled on the bearing portion of stud bolts 64, the lower ends of which are threaded to engage drilled and tapped holes 65 in the other ends of links 62 nearer to levers 32.

Hence, as nut 56 moves, stem 12 is turned through a corresponding angle in an opening or closing direction, as the case may be. Maximum thrust by the link mechanism 62 against the lever mechanism 32 occurs in the initial portion of the opening stroke of nut 56 which normally is, as illustrated in the diagram of FIGURE 4, a zone of maximum resistance to movement in the case of a number of rotary stem valves; thus, in FIGURE 4, dash line A may indicate torque force required to move a rotary valve stem between a full closed position at the left hand ordinate and its full open position, while claim line B is used to indicate the required torque force for a somewhat different type of rotary valve. In each case, however, a maximum torque zone occurs in the early part of an opening cycle from fully closed position and that maximum torque requirement is met in operator 10 by a fuller thrust generated in the course of an operation thereof. During such fuller thrust, there is, further, less cross stress exerted upon nut 56 and shaft 47 in view of the virtually straight alignment between link mechanism 62 and the axis of shaft 47 thereby inhibiting deflection and jamming.

Conversely, upon closing of stem 12 with nut 56 being moved to the left (down) as viewed in FIGURE 1, greater force is exerted as the valve approaches its fully closed condition with relatively parallel alignment between links 62 and the shaft 47 and a relatively larger lever arm measured from the center of stem 12 to the axis of bolts 64 of the lever mechanism 32 to avoid forces tending to cause the parts to jam or deflect. Still further, the link and lever mechanism is so constructed and arranged that it in no way interferes with the operation of the limit switch members 25 when cam 57 engages them respectively, conducing to marked improvement and simplification of construction and operation.

A variety of means may be utilized to hold the valve in whatever angular position the stem 12 may be moved to by operator 10, either by means (not shown) in the valve itself, or by having a magnetic brake connected to shaft 51, for example, for engagement whenever motor 21 is de-energized, or by other means available for such holding when there is no energization of the mechanism of device 10. Further, in the event that an operator embodying the principles of my invention is to be buried underground, bolt 35 and cap 38 may be removed and a fixed cap plate bolted to cover 20 over the opening 41 with suitable gasket provision around the edge of the fixed cap plate and an annular bearing track on the underside thereof to engage the upper edge of sleeve 33 to permit relative movement therebetween, and, the handwheel 23 may be removed and a closure put over that end of shaft 47 and secured to housing 52, to keep all operating parts wholly enclosed.

Various changes in the illustrated embodiment may be made and other embodiments provided without departing from the spirit of my invention or the scope of the appended claims.

I claim:

1. In a valve operator for a valve having a rotatable stem movable through an arc and normally requiring a greater torque in a zone nearer one end of said arc of movement; apparatus comprising, in combination, a lever connected to said stem and extending away therefrom at an angle to the axis thereof, said lever having an outer end swingable through an arc corresponding to the arc of movement of said stem, a rotatable substantially axially immovable threaded shaft which intersects the arc of movement of said outer end of said lever, said shaft being journaled axially outwardly of each end of said arc of movement, a nut engaging said threaded shaft for movement therealong upon rotation of said shaft, a link pivotally connected to said nut and the outer end of said lever, said link having its length substantially parallel to the axis of said shaft when said nut is positioned adjacent one end of said shaft corresponding to said one end of said arc of movement, said link extending generally toward the other end of said shaft to exercise substantially straight-line thrust upon movement thereof away from said one end of said shaft, whereby the force to satisfy said greater torque is delivered by said operator when said link is substantially parallel to said shaft thereby inhibiting deflection and jamming.

2. In a valve operator for valves having a rotatable stem; apparatus comprising, in combination, a main housing into which said stem extends, a ball screw shaft rotatably mounted in said housing to one side of said stem and at a right angle to the axis thereof, said shaft being substantially axially immovable and adapted to be driven in either direction by means operatively connected to at least one end thereof, a lever fixed to said stem and extending toward said shaft, said lever having an outer end which moves through an arc which is intersected by a plane through the axis of said shaft parallel to the axis of said stem, a ball threaded nut engaging said ball screw of said shaft, a link having one end pivotally connected to said nut and the other end pivotally connected to an outer portion of said lever adjacent said plane, said link having a line joining the respective pivot axes thereof lying substantially in said plane when said nut is adjacent one extremity of said ball screw with said link extending generally toward the other extremity thereof, a cam face on said nut on a side thereof opposite the side facing said stem, limit switch trip members projecting toward said shaft at an abrupt angle thereto adjacent the respective extremities of said ball screw and adapted to be respectively engaged by said cam portion, when said nut is moved to one extremity or the other of said ball screw by rotation of said shaft, to operatively disconnect said first-named means.

3. In a valve operator for a valve having a rotatable stem subject to maximum torque nearer the closed position of said valve; apparatus comprising, in combination, a lever member adapted to be operatively fixed to said stem to rotate therewith through a sector bounded by an arc, a pair of spaced lever arms in said member extending at right angles to said stem and separated in the direction of the axis of said stem, a pair of similarly spaced links pivotally connected to said arms respectively, a threaded shaft mounted at its respective end portions for rotation only with the axis thereof at right angles to the axis of said stem and parallel to the planes of movement of said arms and links, said arms having outer ends which move through arcs which intersect a plane through the axis of said shaft parallel to the axis of said stem, a nut mounted on said shaft to move axially therealong when said shaft is rotated, said respective links being pivotally connected to opposite sides of said nut at a distance from the respective pivotal connection of said links to said arms, said nut and links being positioned such that a line joining the respective pivotal connections of each link is substantially parallel to the axis of said shaft during a substantial portion of the movement of said nut from one end of said shaft corresponding to said closed position toward the other, said links extending substantially parallel to and in the direction of the other end of said shaft and said lever extending substantially laterally of said shaft when said nut is adjacent said one end of said shaft corresponding to said closed position to exert optimum thrust relatively early upon opening movement of said operator.

4. A valve operator as set forth in claim 3 in which said shaft and nut are provided with a relatively frictionless ball-thread and a housing is provided completely enclosing the operative mechanism.

5. In a valve operator as set forth in claim 1, cam means connected to said nut for linear travel therewith, said cam means projecting farthest in the path of movement thereof toward the direction faced by said cam means.

References Cited in the file of this patent

UNITED STATES PATENTS

| | | |
|---|---|---|
| 298,738 | Ellis | May 20, 1884 |
| 2,414,032 | Fawkes | Jan. 7, 1947 |
| 2,567,035 | Setka | Sept. 4, 1951 |
| 2,704,947 | Hopkins | Mar. 29, 1955 |
| 2,809,011 | Davis | Oct. 8, 1957 |
| 2,815,922 | Thomas et al. | Dec. 10, 1957 |
| 2,851,959 | Kangas | Sept. 16, 1958 |
| 2,885,904 | Roberts | May 12, 1959 |
| 2,908,182 | Bacchi | Oct. 13, 1959 |
| 2,930,252 | Sears et al. | Mar. 29, 1960 |